US011428803B2

(12) United States Patent
Zhai et al.

(10) Patent No.: US 11,428,803 B2
(45) Date of Patent: Aug. 30, 2022

(54) METHOD AND APPARATUS FOR SAR IMAGE DATA ENHANCEMENT, AND STORAGE MEDIUM

(71) Applicant: WUYI University, Guangdong (CN)

(72) Inventors: Yikui Zhai, Guangdong (CN); Wenbo Deng, Guangdong (CN); Qirui Ke, Guangdong (CN); Zilu Ying, Guangdong (CN); Junying Gan, Guangdong (CN); Junying Zeng, Guangdong (CN); Ying Xu, Guangdong (CN)

(73) Assignee: WUYI University, Guangdong (CN)

( * ) Notice: Subject to any disclaimer, the term of this patent is extended or adjusted under 35 U.S.C. 154(b) by 521 days.

(21) Appl. No.: 16/530,724

(22) Filed: Aug. 2, 2019

(65) Prior Publication Data
US 2021/0003699 A1 Jan. 7, 2021

(30) Foreign Application Priority Data
Jul. 2, 2019 (CN) .......................... 201910589014.4

(51) Int. Cl.
*G01S 13/90* (2006.01)
*G01S 7/41* (2006.01)
*G06T 5/50* (2006.01)

(52) U.S. Cl.
CPC .......... *G01S 13/9027* (2019.05); *G01S 7/417* (2013.01); *G06T 5/50* (2013.01); *G06T 2207/10041* (2013.01); *G06T 2207/20081* (2013.01); *G06T 2207/20084* (2013.01)

(58) Field of Classification Search
CPC ....... G01S 13/9027; G01S 7/417; G06T 5/50; G06T 2207/10041; G06T 2207/20081; G06T 2207/20084; G06T 5/00
See application file for complete search history.

(56) References Cited

U.S. PATENT DOCUMENTS

| 2016/0019458 | A1* | 1/2016 | Kaufhold | ............ | G01S 13/9027 706/20 |
| 2020/0193227 | A1* | 6/2020 | Zhou | ........................ | G06F 30/23 |
| 2020/0264300 | A1* | 8/2020 | Rostami | .............. | G01S 13/9027 |

FOREIGN PATENT DOCUMENTS

| CN | 106355151 | A | * | 1/2017 | ......... | G06K 9/00208 |
| CN | 106569191 | A | * | 4/2017 | | |
| CN | 109934282 | A | * | 6/2019 | | |

OTHER PUBLICATIONS

Wang, H., Wang, J., Wang, J., Zhao, M., Zhang, W., Zhang, F., Xie, X., & Guo, M. (2018). GraphGAN: Graph Representation Learning With Generative Adversarial Nets. Proceedings of the AAAI Conference on Artificial Intelligence, 32(1). Retrieved from https://ojs.aaai.org/index.php/AAAI/article/view/11872 (Year: 2018).*

* cited by examiner

*Primary Examiner* — Vladimir Magloire
*Assistant Examiner* — Nazra Nur Waheed
(74) *Attorney, Agent, or Firm* — Farjami & Farjami LLP (57) ABSTRACT

Disclosed are a method and apparatus for SAR image data enhancement, and a storage medium. The method includes: processing an SAR target image by electromagnetic simulation to acquire an SAR electromagnetic simulation image; and processing the SAR electromagnetic simulation image and the SAR target image by a generative adversarial network to obtain a set of virtual samples of the SAR target image.

12 Claims, 6 Drawing Sheets

METHOD AND APPARATUS FOR SAR IMAGE DATA ENHANCEMENT, AND STORAGE MEDIUM

CROSS REFERENCE TO RELATED APPLICATION

The disclosure relates to the field of image data processing technologies, and in particular to a method and apparatus for synthetic aperture radar (SAR) image data enhancement, and a storage medium.

FIELD

The disclosure relates to the field of image data processing technologies, and in particular to a method and apparatus for SAR image data enhancement, and a storage medium.

BACKGROUND

At present, with the progress of the construction of Guangdong-Hong Kong-Macao Greater Bay Area, application demands on SAR images in such safety detection fields as detection of remote sensing aviation aircraft, dynamic monitoring of ship targets and dynamic detection of oil spill pre-warning are increasing. Large-scene SAR target recognition in the Guangdong-Hong Kong-Macao Greater Bay Area relies on a large number of labeled samples to construct a classification model, which is limited by the spatial range and regional accessibility and has a high cost. Meanwhile, the cost of annotating data limits the construction of a large-scene SAR database in the Greater Bay Area. Therefore, it is urgent to solve the problems of insufficient labeled training samples and insufficient data richness. The traditional method uses contrast enhancement in spatial and frequency domains of images for data enhancement. However, a sample set acquired by this method has high redundancy, and some details of the SAR target image generated are missing, thus failing to accurately reflect information contained in SAR images, which is not conducive to large-scene SAR image target recognition in the Greater Bay Area.

SUMMARY

To solve the foregoing technical problems, an objective of the disclosure is to provide a method and apparatus for SAR image data enhancement, and a storage medium, for alleviating the problems of inadequate SAR target image samples and insufficient data richness by generating a large number of training samples in combination with SAR electromagnetic simulation images and a generative adversarial network.

The technical solution adopted by the disclosure to solve the problem thereof is as follows.

In a first aspect, the disclosure provides a method for SAR image data enhancement, including the following steps of:

processing an SAR target image by electromagnetic simulation to acquire an SAR electromagnetic simulation image; and processing the SAR electromagnetic simulation image and the SAR target image by a generative adversarial network to obtain a set of virtual samples of the SAR target image.

In some embodiments, processing an SAR target image by electromagnetic simulation to acquire an SAR electromagnetic simulation image includes:

constructing an electromagnetic simulation model by using the SAR target image and simulation parameters;

processing the electromagnetic simulation model by electromagnetic simulation software to obtain radar cross section (RCS) data of the SAR target image; and obtaining the SAR electromagnetic simulation image by inverse image processing on the RCS data.

In some embodiments, processing the SAR electromagnetic simulation image and the SAR target image by a generative adversarial network to obtain a set of virtual samples of the SAR target image includes:

constructing a generator and a discriminator in the generative adversarial network;

inputting the SAR electromagnetic simulation image into the generator to obtain a generative sample similar to a real SAR target image sample;

inputting the SAR target image or the generative sample into the discriminator to obtain feedback information; and outputting, by the generator, the set of virtual samples of the SAR target image according to the feedback information.

In some embodiments, the generative adversarial network is GraphGAN.

In some embodiments, the generator adopts a convolutional neural network structure.

In a second aspect, the disclosure provides an SAR image data enhancement apparatus, including:

at least one control processor, and a memory communicating with the at least one control processor and having instructions stored thereon, and the instructions being executable by the at least one control processor to enable the at least one control processor to perform the method for SAR image data enhancement described in the first aspect.

In a third aspect, the disclosure provides a computer readable storage medium having computer executable instructions stored thereon, wherein the instructions, when executed by a computer, causes the computer to perform the method for SAR image data enhancement described in the first aspect.

The disclosure has the following beneficial effects. In the disclosure, an SAR target image is processed by electromagnetic simulation to acquire a multi-azimuth SAR electromagnetic simulation image, which overcomes the shortcoming of traditional acquisition of insufficient SAR target image samples, and provides sufficient data input for subsequently solving the problem of scare training data in the process of deep learning training. A mapping relationship between the SAR electromagnetic simulation image and the SAR target image is learned by a generative adversarial network, which improves data richness of the SAR electromagnetic simulation image, thus expanding the angle-missing SAR target image and providing strong support for the subsequent recognition and detection of the SAR target image.

BRIEF DESCRIPTION OF THE DRAWINGS

The disclosure is further described below with reference to the accompanying drawings and examples.

DETAILED DESCRIPTION OF THE EMBODIMENTS

The disclosure provides a method and apparatus for SAR image data enhancement, and a storage medium, which can solve the problems of traditional inadequate acquisition of SAR target image samples and insufficient data richness, thus providing strong support for the subsequent recognition and detection of SAR target images.

Embodiments of the disclosure are further set forth below with reference to the accompanying drawings.

Figure 1:
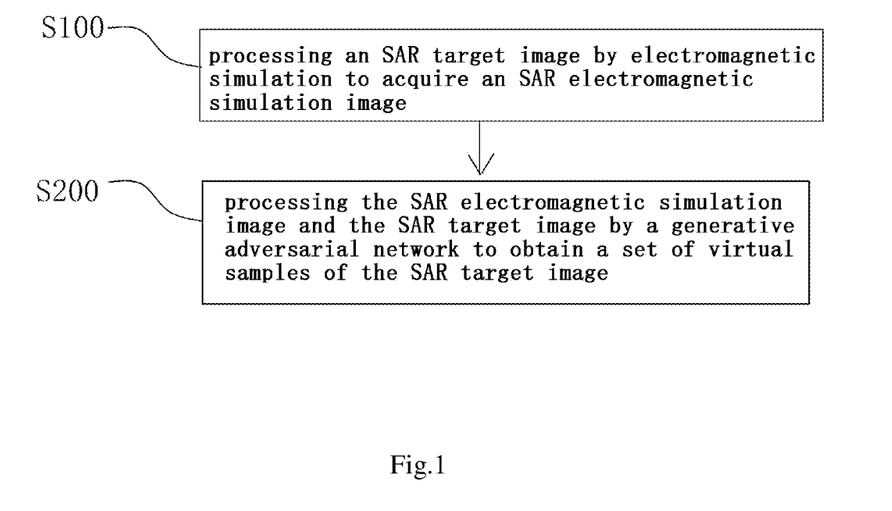
FIG. 1 is a brief schematic flowchart of a method for SAR image data enhancement according to the disclosure.

Referring to FIG. 1, an embodiment of the disclosure provides a method for SAR image data enhancement, including the following steps of:

step S100: processing an SAR target image by electromagnetic simulation to acquire an SAR electromagnetic simulation image; and step S200: processing the SAR electromagnetic simulation image and the SAR target image by a generative adversarial network to obtain a set of virtual samples of the SAR target image.

In this embodiment, in step S100, an SAR electromagnetic simulation image at a multi-azimuth angle of 0-360 degrees can be obtained by processing an SAR target image by electromagnetic simulation, which solves the problem of traditional inadequate acquisition of SAR target image samples, and has a low acquisition cost and few restrictions, thus providing sufficient data input for subsequently solving the problem of scarce training data in the process of deep learning training.

In step S200, a mapping relationship between the SAR electromagnetic simulation image and the SAR target image is learned by a generative adversarial network to obtain a set of virtual samples of the SAR target image, which improves data richness of the SAR electromagnetic simulation image, thereby expanding the SAR target image lacking angle richness and provide strong support for the subsequent recognition and detection of the SAR target image.

Figure 2:
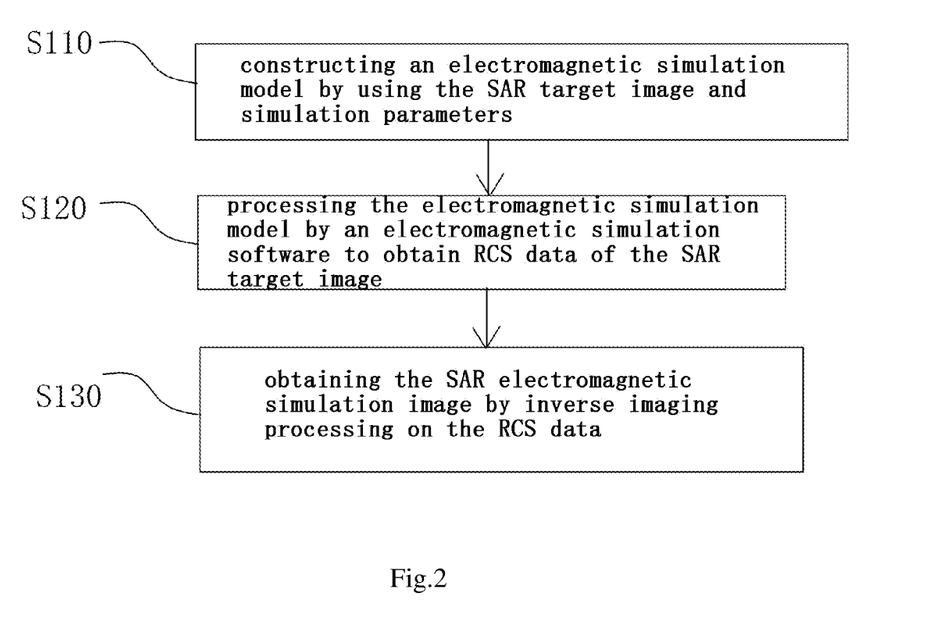
FIG. 2 is a brief schematic flowchart of processing an SAR target image by electromagnetic simulation according to the disclosure.

Further, referring to FIG. 2, another embodiment of the disclosure further provides a method for SAR image data enhancement, wherein processing an SAR target image by electromagnetic simulation to acquire an SAR electromagnetic simulation image includes:

step S110: constructing an electromagnetic simulation model by using the SAR target image and simulation parameters;

step S120: processing the electromagnetic simulation model by an electromagnetic simulation software to obtain RCS data of the SAR target image; and step S130: obtaining the SAR electromagnetic simulation image by inverse imaging processing on the RCS data.

In this embodiment, in step S110, a target scene is modeled based on real data of an SAR target image, and simulation parameters are set for the real data (mainly including resolution, incidence angle, carrier frequency band, etc.) to construct an electromagnetic simulation model. The electromagnetic model is established to mainly include point targets and ground targets. Modeling and simulation of point targets are mainly to verify the inverse imaging performance of RCS data and a relative positional relationship of the targets. Simulation of the ground targets mainly provides data input for subsequent deep learning. In electromagnetic simulation of high-frequency radar targets, corner reflectors or small-sized metal balls are often used to simulate point-target imaging, so the small-sized metal balls are used in electromagnetic modeling of the point targets. For the electromagnetic modeling process of the ground targets, in the embodiment of the disclosure, a 3D model is designed based on 3D Studio Max software and imported into a CST simulation software platform for experiments. Further adjustment on the grid of the imported model can ensure the simulation speed and a better effect. In addition, in the embodiment of the disclosure, the construction of the electromagnetic simulation model for the SAR target image has few restrictions and a low acquisition cost.

In step S120, simulation parameters of the constructed electromagnetic simulation model are set in CST simulation software, and RCS data, i.e., a scattering coefficient radar cross-sectional area, of the SAR target image corresponding to incident-angle azimuth is obtained with an algorithm A by simulation. The entire process of calculating the scattering coefficient radar cross-sectional area of the SAR target image is implemented by the CST simulation software. The scattering coefficient radar cross-sectional area is a converted area of a target, which is used to measure the intensity of echo generated by the target under the irradiation of radar waves. To determine a scattering coefficient radar cross-sectional area, the radar energy reflected by a target towards an observer is measured or calculated at first, then the size of a reflecting sphere (an optical equivalent can be a spherical mirror) that can return the same radar energy is calculated, and a projected area of the sphere (i.e. the area of a circle) is the scattering coefficient radar cross-sectional area of the target.

In step S130, since the process of calculation of the RCS data of the SAR target image by electromagnetic simulation is similar to that of radar acquisition of echo signals in rotation target imaging, inverse imaging of the RCS data can be achieved based on the rotation imaging principle. The imaging principle will be briefly introduced below.

Figure 5:
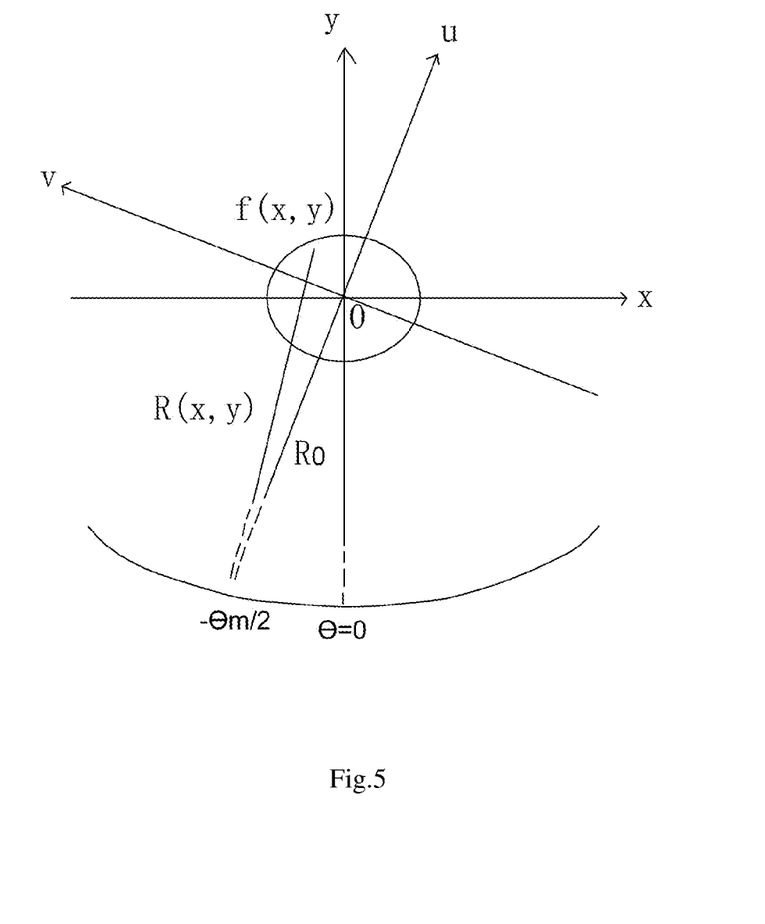
FIG. 5 is a schematic diagram of an RCS reconstructed geometry according to the disclosure.

The reconstructed geometry is as shown in FIG. 5, where (x,y) is a target coordinate system and (u,v) is a radar coordinate system. In the simulation process, the target and the radar move relatively, and a rotation angle is $\theta_m$.

According to the coordinate transformation formula, a coordinate system transformation formula from x-y to u-v is:

$$u = x \cos\theta + y \sin\theta$$

$$v = -x \sin\theta + y \cos\theta$$

A coordinate system transformation formula from u-v to x-y is:

$$x = u \cos\theta - v \sin\theta$$

$$y = u \sin\theta + v \cos\theta$$

According to the geometric relationship in FIG. 5, a distance from any point P on a target surface to the radar can be expressed as:

$$R_\theta(x,y) = \sqrt{(R_0+v)^2 + u^2} = \sqrt{R_0^2 + x^2 + y^2 + 2R_0(y\cos\theta - x\sin\theta)}$$

As the electromagnetic simulation process simulates rotation target imaging, the radar transmits a linear frequency modulated signal and receives an echo signal. The echo signal after mixing is:

$$S(k,\theta) = \int_y \int_x f(x,y) \exp\{-j2\pi k[R_\theta(x,y) - R_0]\} dx dy$$

where $S(k,\theta)$ is received echo data, $f(x,y)$ is an electromagnetic scattering characteristic function of the target, k is a radar observing frequency, and C is the velocity of light. That is, $$k = \frac{2}{C}(f_0 + at)$$

As the electromagnetic simulation process meets a far-field condition, a distance $R_0$ from the radar to a center point of a scene is far greater than that from the target to the center point of the scene; in this case, the formula $R_\theta(x,y) = \sqrt{(R_0+v)^2+u^2} = \sqrt{R_0^2+x^2+y^2+2R_0(y\cos\theta - x\sin\theta)}$ can be simplified as:

$$R_\theta(x,y) \approx R_0 + v = R_0 - x\sin\theta + y\cos\theta$$

Further, the simplified slant-range formula is substituted into the formula $S(k,\theta) = \int_y \int_x f(x,y) \exp\{-j2\pi k[R_\theta(x,y) - R_0]\} dx dy$, and a relationship between the target echo $S(k,\theta)$ and the electromagnetic scattering characteristic function $f(x,y)$ of the target can be obtained:

$$S(k,\theta) = \int_y \int_x f(x,y) \exp\{-j2\pi k[-x\sin\theta + y\cos\theta]\} dx dy$$

According to the formulas $x = u\cos\theta - v\sin\theta$ and $y = u\sin\theta + v\cos\theta$, the formula $S(k,\theta) = \int_y \int_x f(x,y) \exp\{-j2\pi k[-x\sin\theta + y\cos\theta]\} dx dy$ is coordinate-transformed to obtain:

$$S(k,\theta) = \int_u \int_v f(u\cos\theta - v\sin\theta, u\sin\theta + v\cos\theta) \cdot \exp(-j2\pi kv) du dv$$
$$= \int_v p_\theta(v) \exp(-j2\pi kv) dv$$

where $p_\theta(v) = f(u\cos\theta - v\sin\theta, u\sin\theta + v\cos\theta)$ indicates the projection of the electromagnetic scattering characteristic function $f(x,y)$ of the target on the v axis, and from the formula:

$$S(k,\theta) = \int_u \int_v f(u\cos\theta - v\sin\theta, u\sin\theta + v\cos\theta) \cdot \exp(-j2\pi kv) du dv$$
$$= \int_v p_\theta(v) \exp(-j2\pi kv) dv$$

it can be known that in the case of a fixed observation angle, the echo data is obtained by conducting Fourier transform on $p_\theta(v)$. A two-dimensional spectrum slice of $f(x,y)$ can be expressed as $F(k,\theta)$. An expression of the slice can be obtained as $S(k,\theta) = F(-k\sin\theta, k\cos\theta)$, according to the formula $S(k,\theta) = \int_y \int_x f(x,y) \exp\{-j2\pi k[-x\sin\theta + y\cos\theta]\} dx dy$.

The RCS data of the target obtained by electromagnetic simulation at each observation angle is slice sampling of the target at the observation angle $F(k_x, k_y)$, and then a scattering characteristic time-domain expression $f(x,y)$ of the target can be obtained by inversion through two-dimensional Fourier transform.

Figure 6:
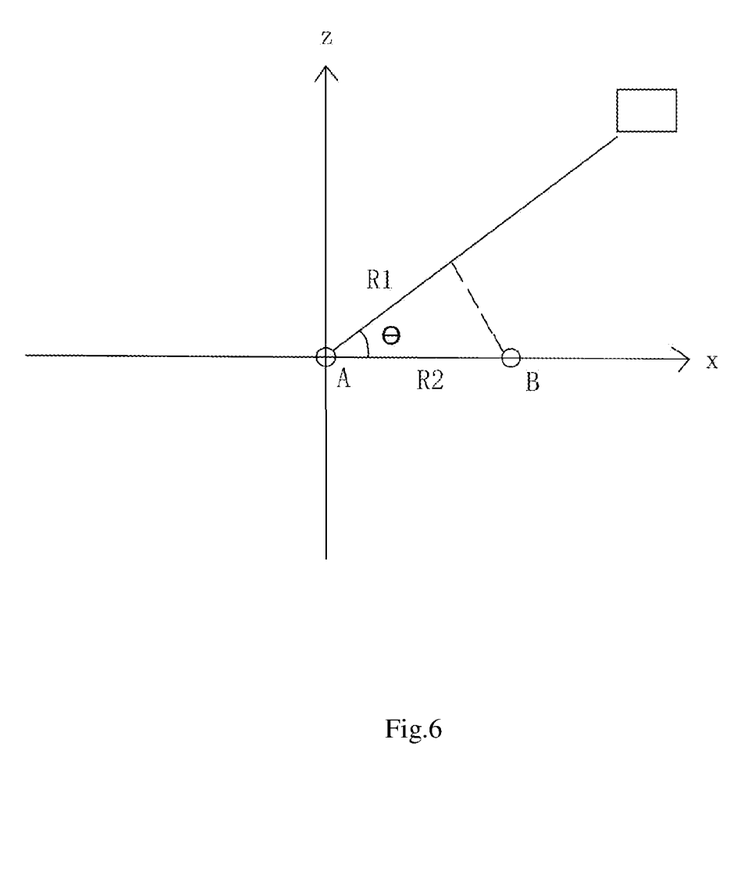
FIG. 6 is a schematic diagram of an electromagnetic simulation imaging geometry according to the disclosure.

As the electromagnetic simulation process is similar to the rotation imaging, the results obtained through RCS inversion imaging are slant-plane images, which needs to be corrected to the ground plane. As the simulation process is a positive side view, the imaging geometric relationship is as shown in FIG. 6:

where A and B are two targets in the simulation process, $R_1$ denotes a distance between the two targets on the ground plane, $R_2$ denotes a distance between the two targets on the slant plane, and $\theta$ is an incident angle. Then, a conversion relationship between the ground plane and the slant plane is:

$$R_2 = R_1 \cos(\theta)$$

The correction process adopts point-by-point correction. Firstly, a ground-plane scene area is selected, and the corresponding position in the slant image is calculated according to the formula $R_2 = R_1 \cos(\theta)$, and a pixel value of a target point is obtained by interpolation.

The method of acquiring SAR image data by electromagnetic simulation has a relatively low cost and is suitable for acquisition of large-scale remote sensing data.

Figure 3:
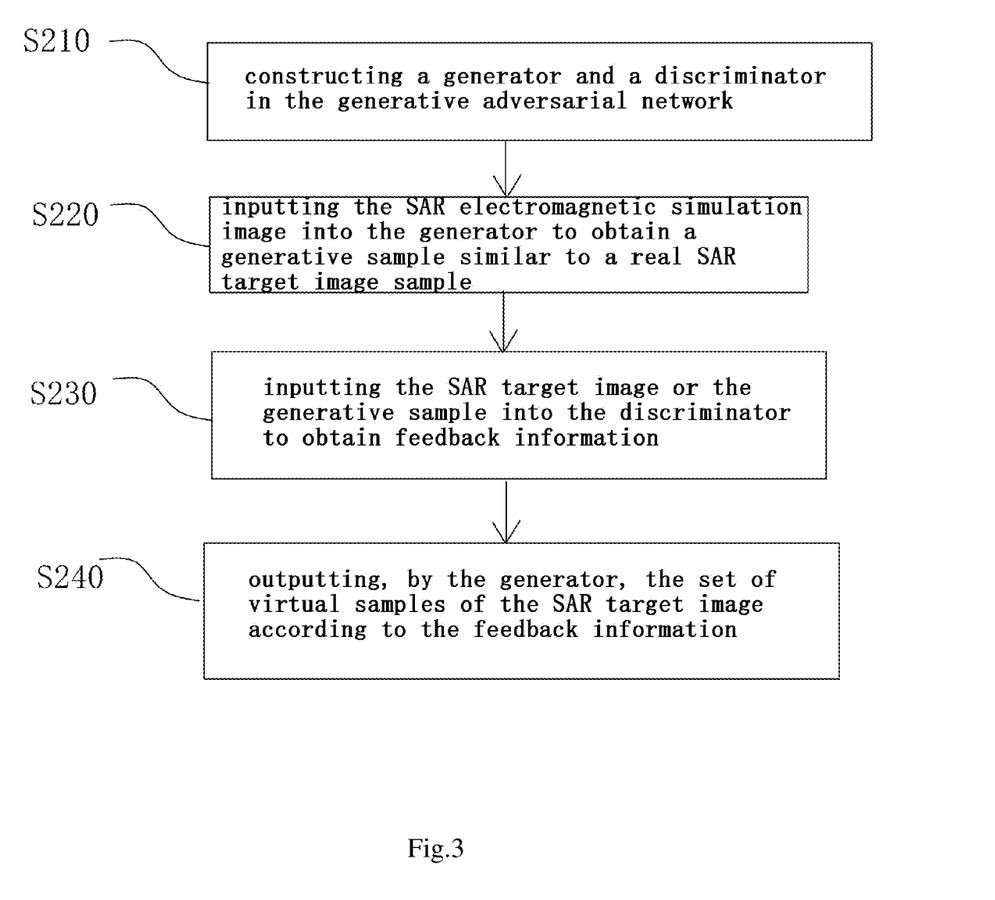
FIG. 3 is a brief schematic flowchart of processing an SAR electromagnetic simulation image and the SAR target image by a generative adversarial network according to the disclosure.

Further, referring to FIG. 3, another embodiment of the disclosure further provides a method for SAR image data enhancement, wherein processing the SAR electromagnetic simulation image and the SAR target image by a generative adversarial network to obtain a set of virtual samples of the SAR target image includes:

step S210: constructing a generator and a discriminator in the generative adversarial network;

step S220: inputting the SAR electromagnetic simulation image into the generator to obtain a generative sample similar to a real SAR target image sample;

step S230: inputting the SAR target image or the generative sample into the discriminator to obtain feedback information; and step S240: outputting, by the generator, the set of virtual samples of the SAR target image according to the feedback information.

In this embodiment, the generative adversarial network is a generative model. The input of the model is an SAR electromagnetic simulation image, and the output is a set of virtual samples of the SAR target image similar to a real SAR target image. The difference between the input and output data distributions is a loss function of the generative model.

Figure 7:
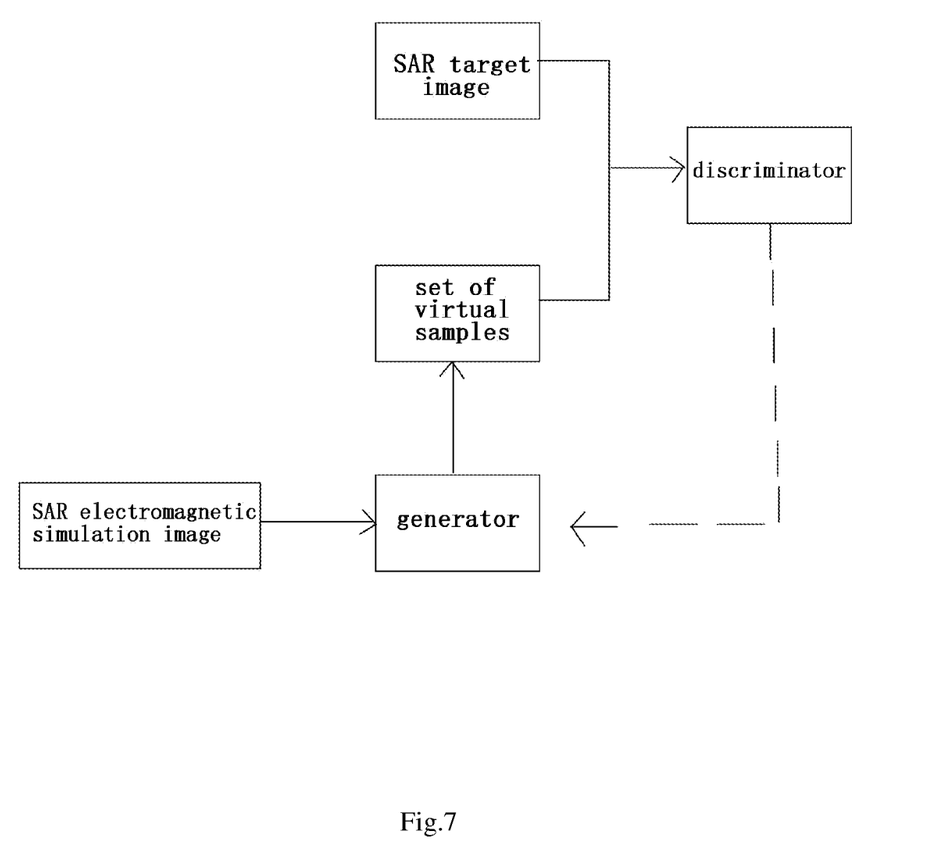
FIG. 7 is a schematic diagram of a connection relationship between modules for processing the SAR electromagnetic simulation image and the SAR target image by a generative adversarial network according to the disclosure.

The generative adversarial network generates data by simultaneously training two models: a generator G and a discriminator D. The network structure is as shown in FIG. 7. G receives the SAR electromagnetic simulation image and generates a generative sample similar to a real SAR target image. The effect of the generative sample is as real as possible through processing. D is a binary classifier, whose input is the real SAR target image or the generative sample generated by the generator. D discriminates the input image with respect to the probability that the input image is from the real SAR target image. If the input image is from the real SAR target image, D outputs a high probability; otherwise, it outputs a low probability. The process is essentially a model training process, which is a zero-sum game about G and D. In the loss function, it is necessary to minimize the probability of discriminating the sample generated by the generator G, i.e. alternately training the generator and the discriminator, while the maximization of the probability of correct discrimination of the discriminator D is satisfied. D will receive the real SAR target image and a "false" SAR target image generated by G. For the final output, parameters of both sides can be adjusted and optimized at the same time. If D makes a correct judgment, the parameters of G need to be adjusted to make the generated "false" SAR target image more "realistic." If D makes a wrong judgment, the parameters of D need to be adjusted to avoid an error in the next similar judgment. In the process of training, data are constantly fitted close, from unstable at the beginning to stable at the end. Ideally, when the final training is completed, the generative sample generated by the generator G is exactly the same as the real SAR target image, and the discriminator D can no longer distinguish whether the image is from the real SAR target image or the generative sample of G. The product after training is a high-quality automatic generator G and a discriminator D with good judging capability.

In this embodiment, SAR image data is expanded by using a trained generative model to obtain a set of virtual samples of the SAR target image. The SAR electromagnetic simulation image is processed by a generative adversarial network, and data richness of the SAR electromagnetic simulation image is further enhanced on the premise of obtaining a multi-azimuth SAR electromagnetic simulation image.

Further, another embodiment of the disclosure further provides a method for SAR image data enhancement, wherein the generative adversarial network is GraphGAN.

In this embodiment, first of all, some symbolic definitions are given, $g=(v,\varepsilon)$ denotes a given network, $V=\{v_1, \ldots, v_V\}$ denotes a set of nodes, and $\varepsilon=\{e_{ij}\}_{i, j=1}^V$ denotes a set of edges. For a given node $v_c$, $N(v_c)$ denotes a node (first-order neighbor) directly adjacent to the node $v_c$, and $p_{true}(v|v_c)$ denotes true conditional distribution of nodes in the network about $v_c$, indicating the connection preference of the node $v_c$. From a certain point of view, $N(v_c)$ can be regarded as a sample set based on $p_{true}(v|v_c)$ sampling.

There are mainly two models in GraphGAN:
(1) generator $G(v|v_c;\theta_G)$: a generative model G mainly tries to fit or estimate the real connection distribution probability as much as possible, so as to select a node most likely to be connected to $v_c$ from a set of nodes V;
(2) discriminator $D(v, v_c; \theta_D)$: a discriminative model D mainly distinguishes a real node pair from a generative node pair, and calculates the possibility of an edge between the output nodes v and $v_c$.

G is intended to generate points that are similar to neighbor nodes actually connected to $v_c$ to fool the discriminator D. D is intended to determine which of these nodes are true neighbors of $v_c$ and which are generated by its opponent G. Therefore, an objective function of a minimax game with two opponents is:

$$\min_{\theta_G}\max_{\theta_D} V(G, D) = \sum_{c=1}^V \left( E_{v \sim p_{true}(\cdot|v_c)}[\log D(v, v_c; \theta_D)] + (E_{v \sim G(\cdot|v_c;\theta_G)}[\log(1 - D(v, v_c; \theta_D))])\right)$$

There are two steps for understanding the target function. As $D(v, v_c; \theta_D)$ outputs a scalar, it indicates the possibility of existence of an edge between the output nodes v and $v_c$. Then,
(1) for $\theta_D$, the discriminator, of course, wants to be able to predict it correctly, that is, to make the probability value of the actual sample large, and to make the probability value of the sample generated by G small, that is, to make $(1-D(v, v_c; \theta_D))$ large, and thus the whole is a maximized objective;
(2) for $\theta_G$, from the perspective of the generator, to fool the discriminator, that is, to make the discriminator incapable of distinguishing a generated sample and regard it as a real sample, i.e., the probability value of existence of an edge between the generated sample and $v_c$ is predicted to be large, namely, to make $(1-D(v, v_c; \theta_D))$ small, and thus it is a minimized objective.

A minimax objective function can be obtained by combining the two objectives, as shown by the equation of the objective function.

The parameters of the generator and the discriminator are continuously updated by alternate training. In each iteration, the discriminator D is trained by positive samples from $p_{true}(v|v_c)$ and negative samples from G. The generator G is updated according to a gradient strategy under the guidance of D.

In this embodiment, the implementation of the discriminative model D is considered as a sigmoid function:

$$D(v, v_c) = \sigma(d_v^T d_{vc}) = \frac{1}{1 + \exp(-d_v^T d_{vc})}$$

where $d_v, d_{vc} \in R^k$ is a k-dimensional vector expression of the nodes v and $v_c$ in the discriminator, so $\theta_D$ can be regarded as a set of all $d_v$.

Therefore, corresponding node-expressed vectors $d_v$ and $d_{vc}$ are updated only by gradient ascent for a given node pair (v, vc):

$$\nabla_{\theta_D} V(G, D) = \begin{cases} \nabla_{\theta_D} \log D(v, v_c), & \text{if } v \sim p_{true}; \\ \nabla_{\theta_D} (1 - \log D(v, v_c)), & \text{if } v \sim G \end{cases}.$$

An objective function of the generator is a minimized minimax function, and thus it can be optimized and updated by gradient descent, and a gradient of the generator is:

$$\nabla_{\theta_G} V(G, D) = \nabla_{\theta_G} \sum_{c=1}^V E_{v \sim G(\cdot|v_c)}[\log(1 - D(v, v_c; \theta_D))]$$

$$= \sum_{c=1}^V E_{v \sim G(\cdot|v_c)}[\nabla_{\theta_G} \log G(v | v_c)\log(1 - D(v, v_c))]$$

It should be noted that the gradient $\theta_{\theta_G}V(G,D)$ can actually be regarded as an expected sum of a gradient $\nabla_{\theta_G} \log G(v|v_c)$ of a weight $\log(1-D(v, v_c; \theta_D))$. That is, if a generative node is identified as a negative sample node, the probability $D(v, v_c; \theta_D)$ will be small, and the weight corresponding to the gradient of the generative node will be large, so that the entire gradient will become large.

The implementation of the generative model is defined by a softmax function:

$$G(v | v_c) = \frac{\exp(g_v^T g_{vc})}{\sum_{v \neq v_c} \exp(g_v^T g_{vc})}$$

where $g_v, g_{vc} \in R^k$ is a k-dimensional vector expression of the nodes v and $v_c$ in the generator, so $\theta_G$ can be regarded as a set of all $g_v$.

Based on such a setting, at first, estimated connection distribution $G(v|v_c; \theta)$ can be calculated according to the formula $$G(v|v_c) = \frac{\exp(g_v^T g_{vc})}{\sum_{v \neq v_c} \exp(g_v^T g_{vc})},$$

then a sample set $(v, v_c)$ can be obtained by random sampling according to the probability value, and finally $\theta_G$ is updated with an SGD method.

In this embodiment, the generative adversarial network uses GraphGAN to connect generated nodes, which has a great advantage in improving the performance, and the generation effect is better than that of an ordinary GAN.

Further, another embodiment of the disclosure further provides a method for SAR image data enhancement, wherein the generator adopts a convolutional neural network structure.

In this embodiment, a convolutional neural network is a deep neural network with a convolution structure. The basic idea thereof is to construct a multi-layer network to express a target in a multi-layer way, so as to represent abstract semantic information of data through high-level features of the multi-layer network and obtain better feature robustness. Meanwhile, the convolution structure can reduce the memory of the deep network. The generator in this embodiment adopts a convolutional neural network structure, which, on the one hand, reduces the number of weights and makes the network easy to optimize, and, on the other hand, reduces the complexity of the model, that is, reduces the risk of overfitting. The advantage is more obvious when the input of the network is an image, so that the image can be directly used as the input of the network, avoiding the complex process of feature extraction and data reconstruction in traditional recognition algorithms. It has a lot of advantages in the process of two-dimensional image processing, for example, the network can extract image features including color, texture, shape and topology structure of the image, and has good robustness and operation efficiency in the two-dimensional image processing, especially in displacement identification, zooming and other forms of distortion invariance applications.

Figure 4:
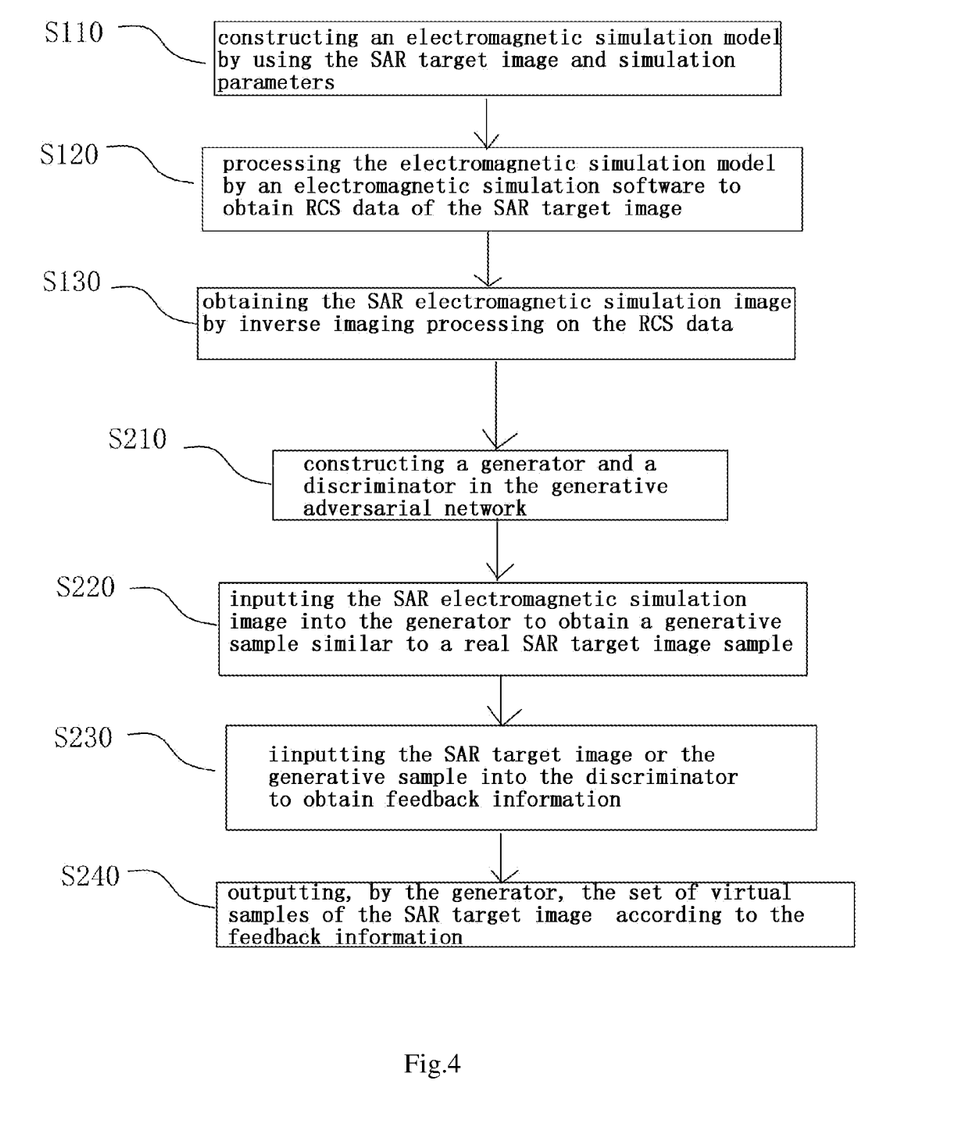
FIG. 4 is a schematic flowchart of a method for SAR image data enhancement according to the disclosure.

In addition, referring to FIG. 4, another embodiment of the disclosure further provides a method for SAR image data enhancement, including the following steps of:

step S110: constructing an electromagnetic simulation model by using the SAR target image and simulation parameters;

step S120: processing the electromagnetic simulation model by an electromagnetic simulation software to obtain RCS data of the SAR target image;

step S130: obtaining the SAR electromagnetic simulation image by inverse imaging processing on the RCS data;

step S210: constructing a generator and a discriminator in the generative adversarial network;

step S220: inputting the SAR electromagnetic simulation image into the generator to obtain a generated sample similar to a real SAR target image sample;

step S230: inputting the SAR target image or the generative sample into the discriminator to obtain feedback information; and step S240: outputting, by the generator, the a set of virtual samples of the SAR target image according to the feedback information.

In this embodiment, in step S110, a target scene is modeled based on real data of an SAR target image, and simulation parameters are set for the real data (mainly including resolution, incidence angle, carrier frequency band, etc.) to construct an electromagnetic simulation model. The electromagnetic model is established to mainly include point targets and ground targets. Modeling and simulation of point targets are mainly to verify the inverse imaging performance of RCS data and a relative positional relationship of the targets. Simulation of the ground targets mainly provides data input for subsequent deep learning. In electromagnetic simulation of high-frequency radar targets, corner reflectors or small-sized metal balls are often used to simulate point-target imaging, so the small-sized metal balls are used in electromagnetic modeling of the point targets. For the electromagnetic modeling process of the ground targets, in the embodiment of the disclosure, a 3D model is designed based on 3D Studio Max software and imported into a CST simulation software platform for experiments. Further adjustment on the grid of the imported model can ensure the simulation speed and a better effect. In addition, in the embodiment of the disclosure, the construction of the electromagnetic simulation model for the SAR target image has few restrictions and a low acquisition cost.

In step S120, simulation parameters of the constructed electromagnetic simulation model are set in CST simulation software, and RCS data, i.e., a scattering coefficient radar cross-sectional area, of the SAR target image corresponding to incident-angle azimuth is obtained with an algorithm A by simulation. The entire process of calculating the scattering coefficient radar cross-sectional area of the SAR target image is implemented by the CST simulation software. The scattering coefficient radar cross-sectional area is a converted area of a target, which is used to measure the intensity of echo generated by the target under the irradiation of radar waves. To determine a scattering coefficient radar cross-sectional area, the radar energy reflected by a target towards an observer is measured or calculated at first, then the size of a reflecting sphere (an optical equivalent can be a spherical mirror) that can return the same radar energy is calculated, and a projected area of the sphere (i.e. the area of a circle) is the scattering coefficient radar cross-sectional area of the target.

In step S130, since the process of calculation of the RCS data of the SAR target image by electromagnetic simulation is similar to that of radar acquisition of echo signals in rotation target imaging, inverse imaging of the RCS data can be achieved based on the rotation imaging principle. The imaging principle will be briefly introduced below.

The reconstructed geometry is as shown in FIG. 5, where (x,y) is a target coordinate system and (u,v) is a radar coordinate system. In the simulation process, the target and the radar move relatively, and a rotation angle is $\theta_m$.

According to the coordinate transformation formula, a coordinate system transformation formula from x-y to u-v is:

$u = x \cos\theta + y \sin\theta$ $v = -x \sin\theta + y \cos\theta$

A coordinate system transformation formula from u-v to x-y is:

$x = u \cos\theta - v \sin\theta$ $y = u \sin\theta + v \cos\theta$

According to the geometric relationship in FIG. 5, a distance from any point P on a target surface to the radar can be expressed as:

$$R_\theta(x,y)=\sqrt{(R_0+v)^2+u^2}=\sqrt{R_0^2+x^2+y^2+2R_0(y\cos\theta-x\sin\theta)}$$

As the electromagnetic simulation process simulates rotation target imaging, the radar transmits a linear frequency modulated signal and receives an echo signal. The echo signal after mixing is:

$$S(k,\theta)=\int_y\int_x f(x,y)\exp\{-j2\pi k[R_\theta(x,y)-R_0]\}dxdy$$

where $S(k,\theta)$ is received echo data, $f(x,y)$ is an electromagnetic scattering characteristic function of the target, k is a radar observing frequency, and C is the velocity of light. That is, $$k=\frac{2}{C}(f_0+at)$$

As the electromagnetic simulation process meets a far-field condition, a distance $R_0$ from the radar to a center point of a scene is far greater than that from the target to the center point of the scene; in this case, the formula $R_\theta(x,y)=\sqrt{(R_0+v)^2+u^2}=\sqrt{R_0^2+x^2+y^2+2R_0(y\cos\theta-x\sin\theta)}$ can be simplified as:

$$R_\theta(x,y)\approx R_0+v=R_0-x\sin\theta+y\cos\theta$$

Further, the simplified slant-range formula is substituted into the formula $S(k,\theta)=\int_y\int_x f(x,y)\exp\{-j2\pi k[R_\theta(x,y)-R_0]\}dxdy$, and a relationship between the target echo $S(k,\theta)$ and the electromagnetic scattering characteristic function $f(x,y)$ of the target can be obtained:

$$S(k,\theta)=\int_y\int_x f(x,y)\exp\{-j2\pi k[-x\sin\theta+y\cos\theta]\}dxdy$$

According to the formulas x=u cos θ−v sin θ and y=u sin θ+v cos θ, the formula $S(k,\theta)=\int_y\int_x f(x,y)\exp\{-j2\pi k[-x\sin\theta+y\cos\theta]\}dxdy$ is coordinate-transformed to obtain:

$$S(k,\theta)=\int_u\int_v f(u\cos\theta-v\sin\theta, u\sin\theta+v\cos\theta)\cdot\exp(-j2\pi kv)dudv$$
$$=\int_v p_\theta(v)\exp(-j2\pi kv)dv$$

where $p_\theta(v)=f(u\cos\theta-v\sin\theta, u\sin\theta+v\cos\theta)$ indicates the projection of the electromagnetic scattering characteristic function $f(x,y)$ of the target on the v axis, and from the formula $$S(k,\theta)=\int_u\int_v f(u\cos\theta-v\sin\theta, u\sin\theta+v\cos\theta)\cdot\exp(-j2\pi kv)dudv$$
$$=\int_v p_\theta(v)\exp(-j2\pi kv)dv$$

it can be known that in the case of a fixed observation angle, the echo data is obtained by conducting Fourier transform on $p_\theta(v)$. A two-dimensional spectrum slice of $f(x,y)$ can be expressed as $F(k,\theta)$. An expression of the slice can be obtained as $S(k,\theta)=F(-k\sin\theta, k\cos\theta)$, according to the formula $S(k,\theta)=\int_y\int_x f(x,y)\exp\{-j2\pi k[-x\sin\theta+y\cos\theta]\}dxdy$.

The RCS data of the target obtained by electromagnetic simulation at each observation angle is slice sampling of the target at the observation angle $F(k_x,k_y)$, and then a scattering characteristic time-domain expression $f(x,y)$ of the target can be obtained by inversion through two-dimensional Fourier transform.

As the electromagnetic simulation process is similar to the rotation imaging, the results obtained through RCS inversion imaging are slant-plane images, which needs to be corrected to the ground plane. As the simulation process is a positive side view, the imaging geometric relationship is as shown in FIG. 6:

where A and B are two targets in the simulation process, $R_1$ denotes a distance between the two targets on the ground plane, $R_2$ denotes a distance between the two targets on the slant plane, and θ is an incident angle. Then, a conversion relationship between the ground plane and the slant plane is:

$$R_2=R_1\cos(\theta)$$

The correction process adopts point-by-point correction. Firstly, a ground-plane scene area is selected, and the corresponding position in the slant image is calculated according to the formula $R_2=R_1\cos(\theta)$, and a pixel value of a target point is obtained by interpolation.

The method of acquiring SAR image data by electromagnetic simulation has a relatively low cost and is suitable for acquisition of large-scale remote sensing data.

In steps S210, S220, S230 and S240, the generative adversarial network is a generative model. The input of the model is an SAR electromagnetic simulation image, and the output is a set of virtual samples of the SAR target image similar to a real SAR target image. The difference between the input and output data distributions is a loss function of the generative model.

The generative adversarial network generates data by simultaneously training two models: a generator G and a discriminator D. The network structure is as shown in FIG. 7. G receives the SAR electromagnetic simulation image and generates a generative sample similar to a real SAR target image. The effect of the generative sample is as real as possible through processing. D is a binary classifier, whose input is the real SAR target image or the generative sample generated by the generator. D discriminates the input image with respect to the probability that the input image is from the real SAR target image. If the input image is from the real SAR target image, D outputs high probability; otherwise, it outputs low probability. The process is essentially a model training process, which is a zero-sum game about G and D. In the loss function, it is necessary to minimize the probability of discriminating the sample generated by the generator G, i.e. alternately training the generator and the discriminator, while the maximization of the probability of correct discrimination of the discriminator D is satisfied. D will receive the real SAR target image and a "false" SAR target image generated by G. For the final output, parameters of both sides can be adjusted and optimized at the same time. If D makes a correct judgment, the parameters of G need to be adjusted to make the generated "false" SAR target image more "realistic." If D makes a wrong judgment, the parameters of D need to be adjusted to avoid an error in the next similar judgment. In the process of training, data are constantly fitted close, from unstable at the beginning to stable at the end. Ideally, when the final training is completed, the generative sample generated by the generator G is exactly the same as the real SAR target image, and the discriminator D can no longer distinguish whether the image is from the real SAR target image or the generative samples of G. The product after the training is a high-quality automatic generator G and a discriminator D with good judgment capability.

In this embodiment, SAR image data is expanded by using a trained generative model to obtain an a set of virtual samples of the SAR target image. The SAR electromagnetic simulation image is processed by a generative adversarial network, and data richness of the SAR electromagnetic simulation image is further enhanced on the premise of obtaining a multi-azimuth SAR electromagnetic simulation image.

Besides, another embodiment of the disclosure further provides an SAR image data enhancement apparatus, including at least one control processor and a memory for communicating with the at least one control processor. The memory may store instructions executable by the at least one control processor, and the instructions, when executed by the at least one control processor, enable the at least one control processor to perform the method for SAR image data enhancement as described in any of above embodiments.

In this embodiment, the apparatus for SAR image data enhancement includes at least one control processor and a memory which can be connected by a bus or in other manners.

As a nonvolatile computer readable storage medium, the memory can be used to store nonvolatile software programs, nonvolatile computer executable programs and modules, such as program instructions/modules corresponding to the method for SAR image data enhancement in the embodiments of the disclosure. The control processor performs various functional applications and data processing of the apparatus for SAR image data enhancement by running the nonvolatile software programs, instructions and modules stored in the memory, that is, implements the method for SAR image data enhancement in the above method embodiments.

The memory may include a program storage area and a data storage area, where the program storage area may store an operating system and an application required by at least one function; and the data storage area may store data created according to use of the apparatus for SAR image data enhancement. In addition, the memory may include a high-speed random access memory, and may further include a nonvolatile memory, for example, at least one disk storage device, a flash memory device, or other nonvolatile solid-state storage devices. In some embodiments, the memory optionally includes memories remotely disposed relative to the control processor, and these remote memories may be connected to the apparatus for SAR image data enhancement via a network. Examples of the network include but are not limited to, the Internet, an intranet, a local area network, a mobile communications network, or a combination thereof.

The one or more modules are stored in the memory, and when executed by the one or more control processors, perform the method for SAR image data enhancement described in the above method embodiments, for example, perform the functions of steps S100 to S200, S110 to S130 and S210 to S240 in the method for SAR image data enhancement described above.

In addition, another embodiment of the disclosure further provides a computer readable storage medium, wherein the computer readable storage medium may store computer executable instructions, and when the computer executable instructions are executed by one or more control processors, for example, one control processor, the one or more control processors can be caused to perform the method for SAR image data enhancement described in the above method embodiments, for example, perform the functions of steps S100 to S200, S110 to S130 and S210 to S240 in the method for SAR image data enhancement described above.

The apparatus embodiments described above are merely schematic. The units described as separate parts may or may not be physically separate, may be located in one position, or may be distributed over a plurality of network units. Some or all of the modules may be selected according to actual needs to achieve the objectives of the solutions of the embodiments.

From the description of the embodiments above, those skilled in the art may clearly understand that the embodiments may be implemented by software plus a necessary universal hardware platform. Those of ordinary skill in the art may understand that implementation of all or some of steps in the method of the above embodiments may be completed by a program instructing relevant hardware, the program may be stored in a computer readable storage medium, and when the program is executed, the process of the above method embodiment may be included. The storage medium may be a magnetic disk, an optical disk, a Read Only Memory (ROM), a Random Access Memory (RAM), or the like.

The above only describes the preferred embodiments of the disclosure. The disclosure is not limited to the above embodiments. Any embodiment should be encompassed in the protection scope of the invention as long as it achieves the technical effect of the disclosure with the same means.

What is claimed is:

1. A method of enhancing synthetic aperture radar (SAR) image data, the method comprising:

processing an SAR target image by an electromagnetic simulation to acquire an SAR electromagnetic simulation image;

processing the SAR electromagnetic simulation image and the SAR target image by a generative adversarial network to obtain a set of virtual samples of the SAR target image;

wherein processing the SAR target image by the electromagnetic simulation to acquire the SAR electromagnetic simulation image comprises:

constructing an electromagnetic simulation model by using the SAR target image and simulation parameters;

processing the electromagnetic simulation model by an electromagnetic simulation software to obtain radar cross section (RCS) data of the SAR target image; and obtaining the SAR electromagnetic simulation image by an inverse image processing on the RCS data;

wherein obtaining the SAR electromagnetic simulation image by the inverse image processing on the RCS data comprises:

transforming the x-y coordinate system to u-v according to coordinate transformation formulas including:

$x = u \cos\theta - v \sin\theta$; and $y = u \sin\theta + v \cos\theta$;

wherein the coordinate transformation formulas from coordinate system u-v to x-y are given as follow:

$u = x \cos\theta + y \sin\theta$; and $v = -x \sin\theta + y \cos\theta$;

expressing a distance from any point P on a target surface to a radar by utilizing a property that in a far-field condition, a distance from the radar to a center point of a scene is greater than that from the target to the center point of the scene:

$R_\theta(x,y) \approx R_0 + v = R_0 - x \sin\theta + y \cos\theta$ wherein $R_0$ indicates a distance from the radar to a center point of a scene, defining a target echo as:

$$S(k,\theta)=\int_y\int_x f(x,y)\exp\{-j2\pi k[R_\theta(x,y)-R_0]\}dxdy$$

wherein k is a radar observing frequency;
substituting $R_\theta(x,y)\approx R_0+v=R_0-x\sin\theta+y\cos\theta$ into $S(k,\theta)=\int_y\int_x f(x,y)\exp\{-j2\pi k[R_\theta(x,y)-R_0]\}dxdy$ to obtain a relationship between the target echo $S(k,\theta)$ and the electromagnetic scattering characteristic function $f(x,y)$ of the target:

$$S(k,\theta)=\int_y\int_x f(x,y)\exp\{-j2\pi k[-x\sin\theta+y\cos\theta]\}dxdy$$

obtaining a Fourier transform on $p_\theta(v)$ by substituting $x=u\cos\theta-v\sin\theta$ and $y=u\sin\theta+v\cos\theta$ into $S(k,\theta)=\int_y\int_x f(x,y)\exp\{-j2\pi k[-x\sin\theta+y\cos\theta]\}dxdy$:

$$S(k,\theta)=\int_u\int_v f(u\cos\theta-v\sin\theta, u\sin\theta+v\cos\theta)\cdot \exp(-j2\pi kv)dudv = \int_v p_\theta(v)\exp(-j2\pi kv)dv$$

wherein $p_\theta(v)=f(u\cos\theta-v\sin\theta, u\sin\theta+v\cos\theta)$ indicates a projection of the electromagnetic scattering characteristic function $f(x,y)$ of the target on the v axis, expressing a two-dimensional spectrum slice of $f(x,y)$ as $F(k,\theta)$;
obtaining an expression of the slice according to $S(k,\theta)=\int_y\int_x f(x,y)\exp\{-j2\pi k[-x\sin\theta+y\cos\theta]\}dxdy$:

$$S(k,\theta)=F(-k\sin\theta, k\cos\theta)$$

slice sampling the RCS data at the observation angle $F(k_x, k_y)$;
applying two-dimensional Fourier transformation to $F(k_x, k_y)$ to obtain a scattering characteristic time-domain expression $f(x,y)$ of the target $F(k_x, k_y)$.

2. The method according to claim 1, wherein processing the SAR electromagnetic simulation image and the SAR target image by the generative adversarial network to obtain the set of virtual samples of the SAR target image comprises:
constructing a generator and a discriminator in the generative adversarial network;
inputting the SAR electromagnetic simulation image into the generator to obtain a generative sample similar to a real SAR target image sample;
inputting the SAR target image or the generative sample into the discriminator to obtain feedback information; and
outputting, by the generator, the set of virtual samples of the SAR target image according to the feedback information.

3. The method according to claim 1, wherein the generative adversarial network is GraphGAN.

4. The method according to claim 2, wherein the generator adopts a convolutional neural network structure.

5. An apparatus for enhancing synthetic aperture radar (SAR) image data, the apparatus comprising:
at least one control processor, and
a memory communicating with the at least one control processor and having instructions stored thereon, and the instructions being executable by the at least one control processor to enable the at least one control processor to:
process an SAR target image by electromagnetic simulation to acquire an SAR electromagnetic simulation image;
process the SAR electromagnetic simulation image and the SAR target image by a generative adversarial network to obtain a set of virtual samples of the SAR target image;

wherein processing the SAR target image by the electromagnetic simulation to acquire the SAR electromagnetic simulation image comprises:
constructing an electromagnetic simulation model by using the SAR target image and simulation parameters;
processing the electromagnetic simulation model by an electromagnetic simulation software to obtain radar cross section (RCS) data of the SAR target image; and
obtaining the SAR electromagnetic simulation image by an inverse image processing on the RCS data;
wherein obtaining the SAR electromagnetic simulation image by the inverse image processing on the RCS data comprises:
transforming the x-y coordinate system to u-v according to coordinate transformation formulas including:

$x = u\cos\theta - v\sin\theta$; and $y = u\sin\theta + v\cos\theta$;

wherein the coordinate transformation formulas from coordinate system u-v to x-y are given as follow:

$u = x\cos\theta + y\sin\theta$; and $v = -x\sin\theta + y\cos\theta$;

expressing a distance from any point P on a target surface to a radar by utilizing a property that in a far-field condition, a distance from the radar to a center point of a scene is greater than that from the target to the center point of the scene:

$R_\theta(x,y)\approx R_0+v=R_0-x\sin\theta+y\cos\theta$ wherein $R_0$ indicates a distance from the radar to a center point of a scene, defining a target echo as:

$$S(k,\theta)=\int_y\int_x f(x,y)\exp\{-j2\pi k[R_\theta(x,y)-R_0]\}dxdy$$

wherein k is a radar observing frequency;
substituting $R_\theta(x,y)\approx R_0+v=R_0-x\sin\theta+y\cos\theta$ into $S(k,\theta)=\int_y\int_x f(x,y)\exp\{-j2\pi k[R_\theta(x,y)-R_0]\}dxdy$ to obtain a relationship between the target echo $S(k,\theta)$ and the electromagnetic scattering characteristic function $f(x,y)$ of the target:

$$S(k,\theta)=\int_y\int_x f(x,y)\exp\{-j2\pi k[-x\sin\theta+y\cos\theta]\}dxdy$$

obtaining a Fourier transform on $p_\theta(v)$ by substituting $x=u\cos\theta-v\sin\theta$ and $y=u\sin\theta+v\cos\theta$ into $S(k,\theta)=\int_y\int_x f(x,y)\exp\{-j2\pi k[-x\sin\theta+y\cos\theta]\}dxdy$:

$$S(k,\theta)=\int_u\int_v f(u\cos\theta-v\sin\theta, u\sin\theta+v\cos\theta)\cdot \exp(-j2\pi kv)dudv = \int_v p_\theta(v)\exp(-j2\pi kv)dv$$

wherein $p_\theta(v)=f(u\cos\theta-v\sin\theta, u\sin\theta+v\cos\theta)$ indicates a projection of the electromagnetic scattering characteristic function $f(x,y)$ of the target on the v axis, expressing a two-dimensional spectrum slice of $f(x,y)$ as $F(k,\theta)$;
obtaining an expression of the slice according to $S(k,\theta)=\int_y\int_x f(x,y)\exp\{-j2\pi k[-x\sin\theta+y\cos\theta]\}dxdy$:

$$S(k,\theta)=F(-k\sin\theta, k\cos\theta)$$

slice sampling the RCS data at the observation angle $F(k_x, k_y)$;
applying two-dimensional Fourier transformation to $F(k_x, k_y)$ to obtain a scattering characteristic time-domain expression $f(x,y)$ of the target $F(k_x, k_y)$.

6. The apparatus according to claim 5, wherein processing the SAR electromagnetic simulation image and the SAR target image by the generative adversarial network to obtain the set of virtual samples of the SAR target image comprises:

constructing a generator and a discriminator in the generative adversarial network;
inputting the SAR electromagnetic simulation image into the generator to obtain a generative sample similar to a real SAR target image sample;
inputting the SAR target image or the generative sample into the discriminator to obtain feedback information; and
outputting, by the generator, the set of virtual samples of the SAR target image according to the feedback information.

7. The apparatus according to claim 5, wherein the generative adversarial network is GraphGAN.

8. The apparatus according to claim 6, wherein the generator adopts a convolutional neural network structure.

9. A computer readable storage medium having computer executable instructions stored thereon, wherein the instructions, when executed by a computer, causes the computer to:
process a synthetic aperture radar (SAR) target image by electromagnetic simulation to acquire an SAR electromagnetic simulation image;
process the SAR electromagnetic simulation image and the SAR target image by a generative adversarial network to obtain a set of virtual samples of the SAR target image;
wherein processing the SAR target image by the electromagnetic simulation to acquire the SAR electromagnetic simulation image comprises:
constructing an electromagnetic simulation model by using the SAR target image and simulation parameters;
processing the electromagnetic simulation model by an electromagnetic simulation software to obtain radar cross section (RCS) data of the SAR target image; and
obtaining the SAR electromagnetic simulation image by an inverse image processing on the RCS data;
wherein obtaining the SAR electromagnetic simulation image by the inverse image processing on the RCS data comprises:
transforming the x-y coordinate system to u-v according to coordinate transformation formulas including:

$x = u \cos \theta - v \sin \theta$; and $y = u \sin \theta + v \cos \theta$;

wherein the coordinate transformation formulas from coordinate system u-v to x-y are given as follow:

$u = x \cos \theta + y \sin \theta$; and $v = -x \sin \theta + y \cos \theta$;

expressing a distance from any point P on a target surface to a radar by utilizing a property that in a far-field condition, a distance from the radar to a center point of a scene is greater than that from the target to the center point of the scene:

$R_\theta(x,y) \approx R_0 + v = R_0 - x \sin \theta + y \cos \theta$ wherein $R_0$ indicates a distance from the radar to a center point of a scene, defining a target echo as:

$S(k,\theta) = \int_y \int_x f(x,y) \exp\{-j2\pi k[R_\theta(x,y) - R_0]\} dxdy$ wherein k is a radar observing frequency;
substituting $R_\theta(x,y) \approx R_0 + v = R_0 - x \sin \theta + y \cos \theta$ into $S(k,\theta) = \int_y \int_x f(x,y) \exp\{-j2\pi k[R_\theta(x,y) - R_0]\} dxdy$ to obtain a relationship between the target echo $S(k,\theta)$ and the electromagnetic scattering characteristic function $f(x,y)$ of the target:

$S(k,\theta) = \int_y \int_x f(x,y) \exp\{-j2\pi k[-x \sin \theta + y \cos \theta]\} dxdy$ obtaining a Fourier transform on $p_\theta(v)$ by substituting $x = u \cos \theta - v \sin \theta$ and $y = u \sin \theta + v \cos \theta$ into $S(k,\theta) = \int_y \int_x f(x,y) \exp\{-j2\pi k[-x \sin \theta + y \cos \theta]\} dxdy$:

$S(k,\theta) = \int_u \int_v f(u \cos \theta - v \sin \theta, u \sin \theta + v \cos \theta) \cdot \exp(-j2\pi kv) du dv = \int_v p_\theta(v) \exp(-j2\pi kv) dv$ wherein $p_\theta(v) = f(u \cos \theta - v \sin \theta, u \sin \theta + v \cos \theta)$ indicates a projection of the electromagnetic scattering characteristic function $f(x,y)$ of the target on the v axis, expressing a two-dimensional spectrum slice of $f(x,y)$ as $F(k,\theta)$;
obtaining an expression of the slice according to $S(k,\theta) = \int_y \int_x f(x,y) \exp\{-j2\pi k[-x \sin \theta + y \cos \theta]\} dxdy$:

$S(k,\theta) = F(-k \sin \theta, k \cos \theta)$ slice sampling the RCS data at the observation angle $F(k_x, k_y)$;
applying two-dimensional Fourier transformation to $F(k_x, k_y)$ to obtain a scattering characteristic time-domain expression $f(x,y)$ of the target $F(k_x, k_y)$.

10. The computer readable storage medium according to claim 9, wherein processing the SAR electromagnetic simulation image and the SAR target image by the generative adversarial network to obtain the set of virtual samples of the SAR target image comprises:
constructing a generator and a discriminator in the generative adversarial network;
inputting the SAR electromagnetic simulation image into the generator to obtain a generative sample similar to a real SAR target image sample;
inputting the SAR target image or the generative sample into the discriminator to obtain feedback information; and
outputting, by the generator, the set of virtual samples of the SAR target image according to the feedback information.

11. The computer readable storage medium according to claim 9, wherein the generative adversarial network is GraphGAN.

12. The computer readable storage medium according to claim 10, wherein the generator adopts a convolutional neural network structure.

* * * * *